United States Patent [19]
Bishop et al.

[11] Patent Number: 6,139,261
[45] Date of Patent: Oct. 31, 2000

[54] BUSHING ASSEMBLY WITH REMOVABLE WEAR SLEEVE

[75] Inventors: Michael J. Bishop, Cincinnati; Andrew J. Lammas, Maineville; James E. Rhoda, Mason, all of Ohio

[73] Assignee: General Electric Company, Cincinnati, Ohio

[21] Appl. No.: 09/293,382

[22] Filed: Apr. 16, 1999

[51] Int. Cl.[7] .................................................. F04D 29/04
[52] U.S. Cl. ...................... 415/148; 415/150; 415/170.1; 415/229; 384/281; 384/300
[58] Field of Search ..................... 415/148, 159, 415/160, 161, 162, 151, 150, 170.1, 174.2, 229; 384/300, 281

[56] References Cited

U.S. PATENT DOCUMENTS

| | | | |
|---|---|---|---|
| 4,808,069 | 2/1989 | Bonner et al. | 415/160 |
| 5,267,798 | 12/1993 | Budris | 384/278 |
| 5,417,499 | 5/1995 | Jacques et al. | 384/298 |

*Primary Examiner*—Edward K. Look
*Assistant Examiner*—Rhonda Barton
*Attorney, Agent, or Firm*—Andrew C. Hess; William Scott Andes

[57] ABSTRACT

A bushing assembly as a means to enable guided movement of a shaft in an opening of a housing comprises a stationary bushing support carried by a housing internal wall. The bushing support has a support internal wall defining a bushing support opening through the bushing support to receive a movable shaft. Carried by the shaft is a removable wear sleeve having a wear sleeve outer wall in juxtaposition with and spaced apart from the support internal wall to permit relative axial movement of the wear sleeve with the shaft within the bushing support opening. Disposed between and for contact with the support internal wall and with the wear sleeve outer wall is an anti-friction layer.

12 Claims, 1 Drawing Sheet

BUSHING ASSEMBLY WITH REMOVABLE WEAR SLEEVE

BACKGROUND OF THE INVENTION

This invention relates to bushing assemblies for use with a movable shaft. More particularly, it relates to use of such assemblies in power generating apparatus such as gas turbine engines.

Most modern designs of axial flow gas turbine engines include the capability to vary the position of certain stationary airfoils or vanes in respect to the airflow through the engine. Early examples of gas turbine engines including such variable mechanisms, typically in the engine compressor section, are shown in U.S. Pat. No. 2,858,062—Allen (patented Oct. 28, 1958); and U.S. Pat. No. 2,933,235—Neumann (patented Apr. 19, 1960). In addition, such variable mechanisms have been used in other parts of the engine, for example in the inlet, in front fans, in aft fans, in sections of the engine downstream of the compressor, and their combinations.

One form of a gas turbine engine compressor variable stator vane assembly uses a shaft, sometimes called a torque shaft, in an actuation system to move groups of vanes in a designed manner. Movement of the shaft, at least one end portion of which is carried in a slot loaded spherical bearing assembly, includes at least partial rotation of the shaft as well as some shaft excitation resulting from normal operation and rotation of the engine. Such action on the combination of a shaft end portion and bearing assembly has resulted in significant wear of the shaft end portion requiring replacement of the entire shaft more frequently than desired.

BRIEF SUMMARY OF THE INVENTION

The present invention, in one form, provides a bushing assembly to replace a bearing assembly. The assembly is in a combination of a stationary housing having a housing internal wall defining a housing opening through the housing, a movable shaft disposed in the housing opening, and means to enable guided movement of the shaft in the housing opening. In accordance with a form of the present invention, the means comprises a bushing assembly comprising a stationary bushing support carried by the housing internal wall, the bushing support having a support internal wall defining a bushing support opening through the bushing support. The bushing assembly includes a removable wear sleeve carried by the shaft, the wear sleeve having a wear sleeve outer wall in juxtaposition with and spaced apart from the support internal wall to permit relative axial movement of the wear sleeve with the shaft within the bushing support opening. In the combination, there is an anti-friction layer disposed between and for contact with the support internal wall and the wear sleeve outer wall.

DETAILED DESCRIPTION OF THE INVENTION

Wear of a movable shaft within a means to guide the shaft is avoided, according to the present invention, by provision of a sacrificial wear sleeve carried by the shaft in combination with a bushing support which cooperates with the wear sleeve through an anti-friction layer. The invention will be more fully understood by reference to the drawings.

Figure 1:
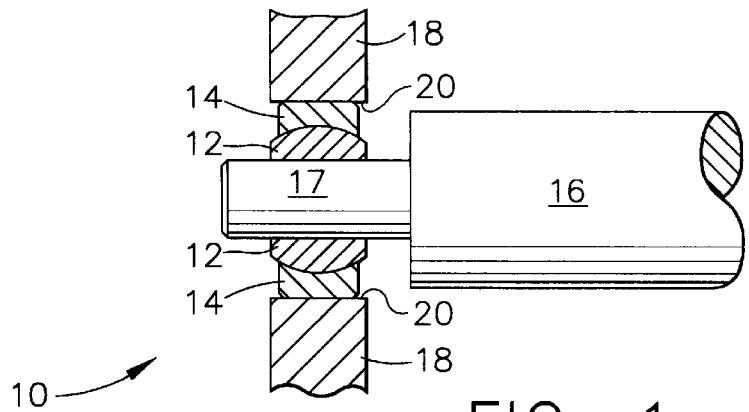
FIG. 1 is a fragmentary, partially sectional diagrammatic view of a current gas turbine engine compressor torque shaft end portion carried in a slot loaded spherical bearing.

The fragmentary, partially sectional view of FIG. 1 shows a currently used slot loaded spherical bearing assembly shown generally at 10 comprising a bearing ball 12 and bearing race 14. The bearing assembly 10 carries and guides movement of an end portion 17 of a movable torque shaft 16. The bearing race and ball combination is carried within housing 18 at housing internal wall 20. A similar bearing assembly (not shown), in one embodiment, is located at another end of torque shaft 16.

Figure 2:
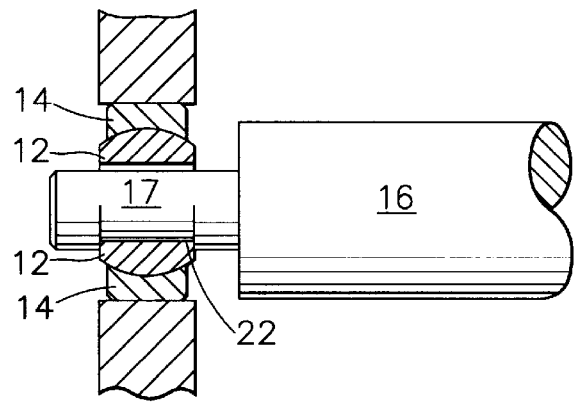
FIG. 2 is a view as in FIG. 1 showing shaft wear from the bearing ball.

During normal operation of the engine, the above-described wear can occur to a torque shaft end portion 17 disposed within and contacted by the bearing ball 12. Wear of the shaft end portion 17 is shown in the fragmentary, partially sectional diagrammatic view of FIG. 2 depicting part the arrangement in FIG. 1. Such wear is shown as an indentation 22 in the end portion 17 of shaft 16. As a result of movement of the shaft end portion 17 against ball 12, the shaft end portion 17 tends to wear and drop by gravity against ball 12. The generation of such wear in the end portion 17 has required removal and replacement of the entire shaft 16.

The present invention avoids wear of a shaft end portion 17 and, therefore, the need to replace the entire shaft 16 as a result of premature wear. One embodiment of the invention is shown in the fragmentary, partially sectional diagrammatic view of FIG. 3. A bushing assembly shown generally at 24 comprises a bushing support 26 carried by internal wall 20 of housing 18. Bushing support 26 includes a support internal wall 28 that defines a bushing support opening 30 through the bushing support. The bushing assembly 24 also includes a removable wear sleeve 32 carried by shaft end portion 17. Wear sleeve 32 has a wear sleeve outer wall 34 in juxtaposition with and spaced apart from support internal wall 28 to enable or permit relative axial movement of wear sleeve 32 with shaft end portion 17 within bushing support opening 30. Disposed between and for contact with support internal wall 28 and with wear sleeve outer wall 34 in bushing assembly 24 is an anti-friction layer 36.

Figure 3:
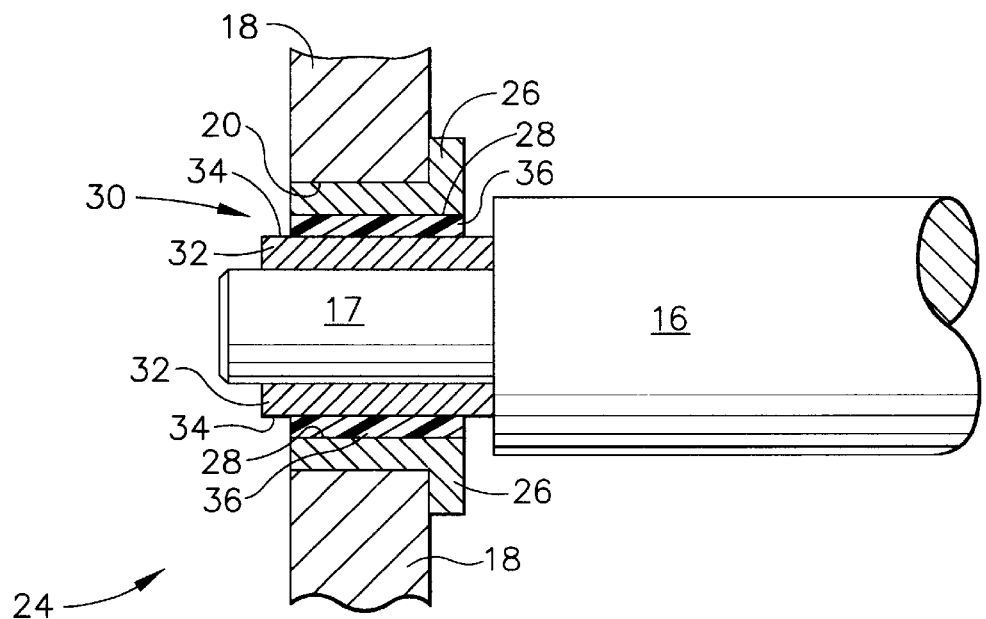
FIG. 3 is a fragmentary, partially sectional diagrammatic view of one embodiment of the bushing assembly of the present invention, assembled with the torque shaft.

During operation of the engine, using the embodiment of FIG. 3, anti-friction layer 36 reduces wear of sleeve 32. However, in the event of damage to wear sleeve 32 as a result of action between bushing support 26 and wear sleeve 32, through anti-friction layer 36, wear sleeve 32 functions as a sacrificial member, protecting shaft 16. Wear sleeve 32 is removable from shaft end portion 17 and can readily be replaced without damage to or replacement of shaft 16.

In one example of the assembly shown in FIG. 3, bushing support 26 and wear sleeve 32 were substantially rigid, metallic members made from a precipitation hardened iron base alloy commercially available as 17-4 PH material. The anti-friction layer 36 was a layer comprising nonmetallic polytetrafluoroethylene (PTFE) material, one form of which commercially is available as Teflon material. In one embodiment of this example, the anti-friction layer was applied as a PTFE coating in the commercial manner to bushing support internal wall 28 to a layer thickness in the range of about 10–20 mils. In another embodiment of this example, the anti-friction layer was a woven fabric including PTFE fibers and glass fibers, the fabric being bonded with bushing support internal wall 28.

It should be understood that other anti-friction materials and members, sometimes called low friction materials, can be used as the anti-friction layer of the present invention. Other examples of such materials include molybdenum disulfide, graphite and other coatings and layers known to be used in the power generation apparatus art, appropriately capable of withstanding conditions of the particular application. Such a layer, which is disposed between and for contact with, bushing support internal wall 28 and wear sleeve outer wall 34, can be applied to or carried by bushing support 26, or wear sleeve 32. Also, an anti-friction layer can be applied to each of the bushing support and to the wear sleeve for contact between such anti-friction layers.

In the example of FIG. 3, bushing support 26 was made in the shape shown in the drawings, with dimensions for press fitting within housing 18. After bonding a coating of Teflon material anti-friction layer 36 to bushing support internal wall 28, bushing support 26 was press fitted at housing internal wall 20, as shown. Wear sleeve 32 was made in the shape shown in the drawings with dimensions for removably press fitting onto shaft end portion 17. To provide the bushing assembly, the members were assembled as shown generally at 24 in FIG. 3. End portion 17 of shaft 16, and the movement of the shaft, was guided by and rotated freely within housing 18 by the assembly 24 form of the present invention.

The present invention has been described in connection with specific examples, embodiments, materials, etc. However, it should be understood that they are intended to be representative of, rather than in any way limiting on, its scope. Those skilled in the various arts involved will understand that the invention is capable of variations and modifications without departing from the scope of the appended claims.

What is claimed is:

1. In a combination with a stationary housing having a housing internal wall defining a housing opening therethrough, a movable shaft disposed in the housing opening, and means to enable guided movement of the shaft in the housing opening, wherein the means comprises a bushing housing comprising:

a substantially rigid metallic stationary bushing support carried by and about the housing internal wall, the bushing support having a support internal wall defining a bushing support opening through the bushing support;

a substantially rigid metallic removable wear sleeve carried by and about the shaft, the wear sleeve having a wear sleeve outer wall in juxtaposition with and spaced apart from the support internal wall to permit relative axial movement of the wear sleeve with the shaft within the bushing support opening; and, a non-metallic anti-friction layer disposed between and for contact with the support internal wall and with the wear sleeve outer wall.

2. The bushing assembly of claim 1 in which the anti-friction layer includes polytetrafluoroethylene.

3. The bushing assembly of claim 2 in which the anti-friction layer is a coating of polytetrafluoroethylene.

4. The bushing assembly of claim 2 in which the anti-friction layer is a fabric including polytetrafluoroethylene fibers.

5. The bushing assembly of claim 1 in which the anti-friction layer is bonded with the support internal wall.

6. The bushing assembly of claim 1 in which the anti-friction layer is bonded with the wear sleeve outer wall.

7. The bushing assembly of claim 1 in which an anti-friction layer is bonded both with the support internal wall and with the wear sleeve outer wall.

8. In a gas turbine engine compressor including a stator vane assembly, in a combination with a stationary housing mounted on the compressor, the housing having a housing internal wall defining a housing opening therethrough, a movable shaft disposed in the housing opening, and means to enable guided movement of the shaft in the housing opening, wherein the means comprises a bushing assembly comprising:

a substantially rigid metallic stationary bushing support carried by and about the housing internal wall, the bushing support having a support internal wall defining a bushing support opening through the bushing support;

a removable substantially rigid metallic wear sleeve carried by and about the shaft, the wear sleeve having a wear sleeve outer wall in juxtaposition with and spaced apart from the support internal wall to permit relative axial movement of the wear sleeve with the shaft within the bushing support opening; and, a non-metallic anti-friction layer disposed between and for contact with the support internal wall and with the wear sleeve outer wall.

9. The bushing assembly of claim 8 in which the anti-friction layer is bonded with the support internal wall.

10. The bushing assembly of claim 8 in which the anti-friction layer is polytetrafluoroethylene.

11. The bushing assembly of claim 10 in which the anti-friction layer is a coating of polytetrafluoroethylene.

12. The bushing assembly of claim 10 in which the anti-friction layer is a fabric including polytetrafluoroethylene fibers.

* * * * *